W. C. KROEGHER.
TIRE.
APPLICATION FILED DEC. 28, 1912.
1,071,438.
Patented Aug. 26, 1913.
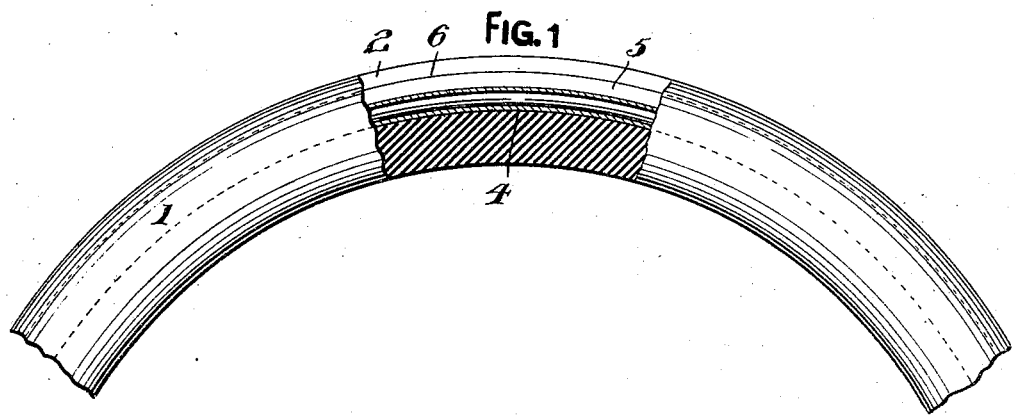
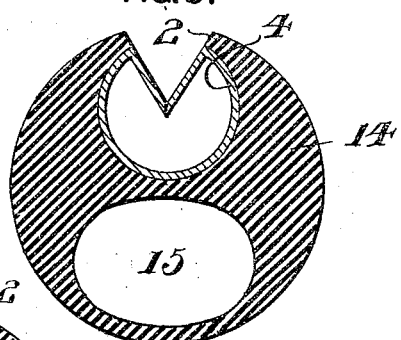
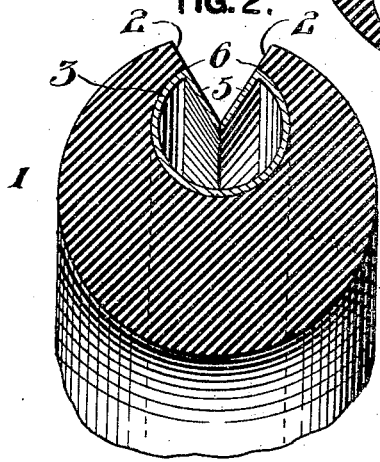
WITNESSES
INVENTOR
W. C. Kroegher
ATTORNEYS

UNITED STATES PATENT OFFICE.

WILHELM C. KROEGHER, OF BELLEVUE, PENNSYLVANIA.

TIRE.

1,071,438.

Specification of Letters Patent. Patented Aug. 26, 1913.

Application filed December 28, 1912. Serial No. 739,077.

*To all whom it may concern:*

Be it known that I, WILHELM C. KROEGHER, a citizen of the United States of America, residing at Bellevue, in the county of Allegheny and State of Pennsylvania, have invented certain new and useful Improvements in Tires, of which the following is a specification, reference being had therein to the accompanying drawing.

This invention relates to tires, and the primary object of my invention is to furnish a solid rubber tire with novel anti-skidding means whereby the tire cannot slide or slip upon smooth and wet surfaces, such as are often encountered when rounding a curved section of road.

Another object of this invention is to furnish a solid tire with a yieldable metallic reinforcement that is embedded within the tire and arranged circumferentially thereof, the reinforcement increasing the lasting qualifications of the tire by preventing to a large degree the cracking, overheating and deterioration of a tire.

A further object of this invention is to provide a tire with a metallic reinforcement that is brought into action as an anti-skidding means when the periphery or tread of a tire is compressed, otherwise the metallic reinforcement not interfering with or impairing the resiliency of the tire for cushioning purposes.

I attain the above objects by a mechanical construction that will be hereinafter specifically described and then claimed, and reference will now be had to the drawing, wherein:—

Figure 1 is a side elevation of a portion of the tire partly broken away and partly in section, Fig. 2 is an enlarged cross sectional view of the preferred form of tire as shown in Fig. 1, Fig. 3 is a similar view of a modification of the invention.

Further describing my invention in detail with reference to the accompanying drawing, wherein like numerals denote corresponding parts throughout the several views:—1 denotes a portion of an annular solid tire that is preferably made of rubber. The periphery or tread of the tire has a V-shaped opening 2 circumferentially thereof and this opening is in communication with a circular pocket 3 circular in cross section that is in closer proximity to the periphery or tread of the tire than the inner side thereof.

4 denotes a metallic reinforcement in the form of a slitted tube that is arranged within the pocket 3, said tube having the slitted edges thereof projected inwardly to form angularly disposed contacting flanges 5. The flanges 5 coöperate with the walls of the tube 4 in forming sharp edges 6 at the inner edges of the opening 2. The outer sides of the flanges 5 are in the same plane as the walls of the opening 2 and when the periphery or tread of the tire is compressed the material forming the walls of the opening 2 is compressed or flattened to that extent that the sharp edges 6 of the tube 4 are exposed and serve as an anti-skidding means for preventing the tire from sliding or slipping upon wet or smooth surfaces.

In Fig. 3 the tire designated 14 is similar to the tire illustrated in Fig. 2, with the exception that it has a cavity 15 formed circumferentially thereof, which can be filled with air.

It is thought that the utility of a tire in accordance with this invention will be apparent without further description, particularly in connection with such vehicles as use solid rubber tires, and while in the drawing there are illustrated the preferred embodiments of my invention, it is to be understood that the structural elements are susceptible to such changes as fall within the scope of the appended claim.

What I claim is:—

The combination with a rubber tire circular in cross section, said tire having its periphery formed with a V-shaped opening circumferentially thereof, said tire further provided with a circular pocket circular in cross section and communicating with said opening, of a circular metallic reinforcement mounted in said pocket and provided with a V-shaped recess, the walls of said recess forming a continuation of the walls of said opening.

In testimony whereof I affix my signature in the presence of two witnesses.

WILHELM C. KROEGHER.

Witnesses:
MAX H. SROLOVITZ,
KATHERINE ERRETT.

Copies of this patent may be obtained for five cents each, by addressing the "Commissioner of Patents, Washington, D. C."